(12) United States Patent
Dodd

(10) Patent No.: US 7,841,607 B2
(45) Date of Patent: Nov. 30, 2010

(54) SPRING BEAM SUSPENSION SYSTEM

(75) Inventor: Cully B. Dodd, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 12 days.

(21) Appl. No.: 12/330,595

(22) Filed: Dec. 9, 2008

(65) Prior Publication Data

US 2010/0140892 A1 Jun. 10, 2010

(51) Int. Cl.
*B60G 21/05* (2006.01)
*B60G 3/12* (2006.01)

(52) U.S. Cl. .................. 280/124.128; 280/124.163; 280/124.164; 280/124.17; 280/124.174

(58) Field of Classification Search .......... 280/124.128, 280/124.163, 124.164, 124.17, 124.174
See application file for complete search history.

(56) References Cited

U.S. PATENT DOCUMENTS

| | | | |
|---|---|---|---|
| 3,782,753 A | 1/1974 | Sweet et al. | |
| 3,844,579 A | 10/1974 | Cunha | |
| 3,960,389 A | 6/1976 | Narahari | |
| 3,966,223 A | 6/1976 | Carr | |
| 3,970,293 A * | 7/1976 | Sweet et al. | 267/31 |
| 4,506,910 A | 3/1985 | Bierens | |
| 4,705,294 A | 11/1987 | Raidel | |
| 4,822,007 A * | 4/1989 | Rogers | 267/32 |
| 4,826,140 A * | 5/1989 | Rogers | 267/32 |
| 5,328,159 A | 7/1994 | Kaufman et al. | |
| 5,332,258 A | 7/1994 | Buttner | |
| 5,362,095 A * | 11/1994 | Eveley | 280/86.75 |
| 5,427,404 A | 6/1995 | Stephens | |
| 5,458,360 A | 10/1995 | Raidel, Sr. | |
| 5,615,906 A | 4/1997 | Raidel, Sr. | |
| 5,634,655 A | 6/1997 | Chalin | |
| 6,073,947 A * | 6/2000 | Gottschalk et al. | 280/124.128 |
| 6,276,710 B1 * | 8/2001 | Sutton | 280/678 |
| 2007/0158924 A1 * | 7/2007 | Peaker et al. | 280/124.116 |

FOREIGN PATENT DOCUMENTS

GB 2272407 A 5/1994

OTHER PUBLICATIONS

Watson & Chalin Manufacturing Drawing No. 100140, Tag Axle Assembly Advance Mixer, Dec. 28, 1998, 4 pages.
HAS Series Air Suspension illustration, undated, 1 page.
REYCO Industries Inc.'s 240AR Air-Ride Suspension product brochure, Oct. 1994, 4 pages.
Weweler Air Springs Maintenance & Installation Manual, Feb. 14, 2008, 21 pages.

* cited by examiner

*Primary Examiner*—Toan C To
(74) *Attorney, Agent, or Firm*—Smith IP Services

(57) ABSTRACT

A spring beam suspension system includes a hanger; a flexible spring beam extending between the hanger and an axle; and a generally U-shaped pivot bracket secured to the spring beam, the pivot bracket including opposing legs which are pivotably attached to the hanger. Another spring beam suspension system includes a lift actuator which lifts the axle by applying a biasing force to a portion of the spring beam which extends forward from the hanger. Yet another suspension system has a bushing secured in the hanger, whereby the beam pivots relative to the bushing.

21 Claims, 4 Drawing Sheets

SPRING BEAM SUSPENSION SYSTEM

BACKGROUND

The present invention relates generally to suspension systems for trucks and trailers and, in a preferred embodiment thereof, more particularly provides a spring beam suspension system.

Suspension systems for large trucks and trailers perform many functions related to the comfort, convenience, and safety of transporting such vehicles on a highway surface. Simply stated, a suspension system acts as an interface between a frame or body of a vehicle and a portion of the vehicle which engages a road surface. The suspension system typically supports or "suspends" the frame and/or body above the road-engaging portion, provides compliance which permits relative motion between them, absorbs shock, adjusts for varied loads and road conditions, structurally interconnects various components of the frame and road-engaging portion, etc.

Many types of suspension systems are well known in the art. One of these is known as a "trailing arm" suspension system. Generally, a trailing arm suspension system incorporates an approximately horizontally disposed arm that is aligned with a direction of travel of a vehicle. A forward end of the arm is usually pivotably attached to a hanger or bracket extending downwardly from the vehicle's frame.

An end of an axle is typically attached to the arm, such that the axle is perpendicular to the arm, and the axle is in most cases rearwardly disposed relative to the hanger. The other end of the axle is likewise attached to another arm. In this manner, the axle is secured to the vehicle and aligned perpendicular to the direction of travel of the vehicle.

A biasing member, such as a spring, is usually connected between the frame and the axle or arm. The spring, thus, biases the frame away from the axle. As a load is added to the vehicle, the spring may compress, or, conversely, as the load is removed from the vehicle, the spring may expand. While the vehicle is being transported across the road surface, the spring may be temporarily compressed as the road-engaging portion strikes an irregularity in the road surface, the spring later expanding when the irregularity has been traversed.

One type of trailing arm suspension system is known as a "spring beam" suspension system. In a spring beam suspension system, the arm is a relatively flexible elongated member known as a "spring beam." Advantages of a spring beam suspension system include additional vertical compliance afforded by the spring beam and an ability of the spring beam to absorb torsional loads imparted thereto by the axle.

A typical spring beam suspension system is found in U.S. Pat. No. 4,506,910 to Bierens, the entire disclosure of which is incorporated herein by this reference. An axle is rigidly clamped to two transversely spaced apart spring beams. The axle is positioned longitudinally between hangers suspending forward ends of the spring beams from a vehicle frame, and air springs disposed between rear ends of the spring beams and the frame.

If one opposite end of the axle is vertically displaced relative to the other opposite end of the axle, such as when a wheel attached to one end of the axle traverses an irregularity on the road surface, the axle is effectively rotated about a longitudinal axis of the vehicle. Since the axle is rigidly clamped to the spring beam, such rotation is transferred from the axle to the spring beam, causing the spring beam to torsionally flex. Some of this torsional loading is absorbed by a pivot bushing attached to the forward end of the spring beam.

Unfortunately, such spring beam suspension systems do not readily lend themselves to applications in which it is desired to lift the axle (for example, to prevent contact between the wheels and the road surface), the bushing is not always securely retained in the spring beam (which flexes as the axle rotates about the longitudinal axis of the vehicle), and such suspension systems (especially the hanger thereof) are relatively complex and expensive to manufacture and maintain. Therefore, it may be seen that improvements are needed in the art of spring beam suspension systems.

SUMMARY

In the present specification, a spring beam suspension system is provided which solves at least one problem in the art. One example is described below in which a hanger is a solid one-piece component which has a spring beam and a support bracket externally attached thereto. Another example is described below in which a lift actuator is used to apply a downwardly directed biasing force to a forward end of the spring beam, to thereby lift an axle.

In one aspect, a spring beam suspension system is provided which includes a hanger, a flexible spring beam extending between the hanger and an axle, and a generally U-shaped pivot bracket secured to the spring beam. The pivot bracket includes opposing legs which are pivotably attached to the hanger.

In another aspect, a spring beam suspension system is provided which includes a hanger, a flexible spring beam extending between the hanger and an axle, and a lift actuator which lifts the axle by applying a biasing force to a portion of the spring beam which extends forward from the hanger.

In yet another aspect, a suspension system is provided which includes a hanger for attaching the suspension system to a frame of a vehicle, a beam extending between the hanger and an axle, with the beam being pivotably attached to the hanger, and a bushing secured in the hanger. In this manner, the beam pivots relative to the bushing.

These and other features, advantages and benefits will become apparent to one of ordinary skill in the art upon careful consideration of the detailed description of representative embodiments below and the accompanying drawings, in which similar elements are indicated in the various figures using the same reference numbers.

DETAILED DESCRIPTION

Figure 1:
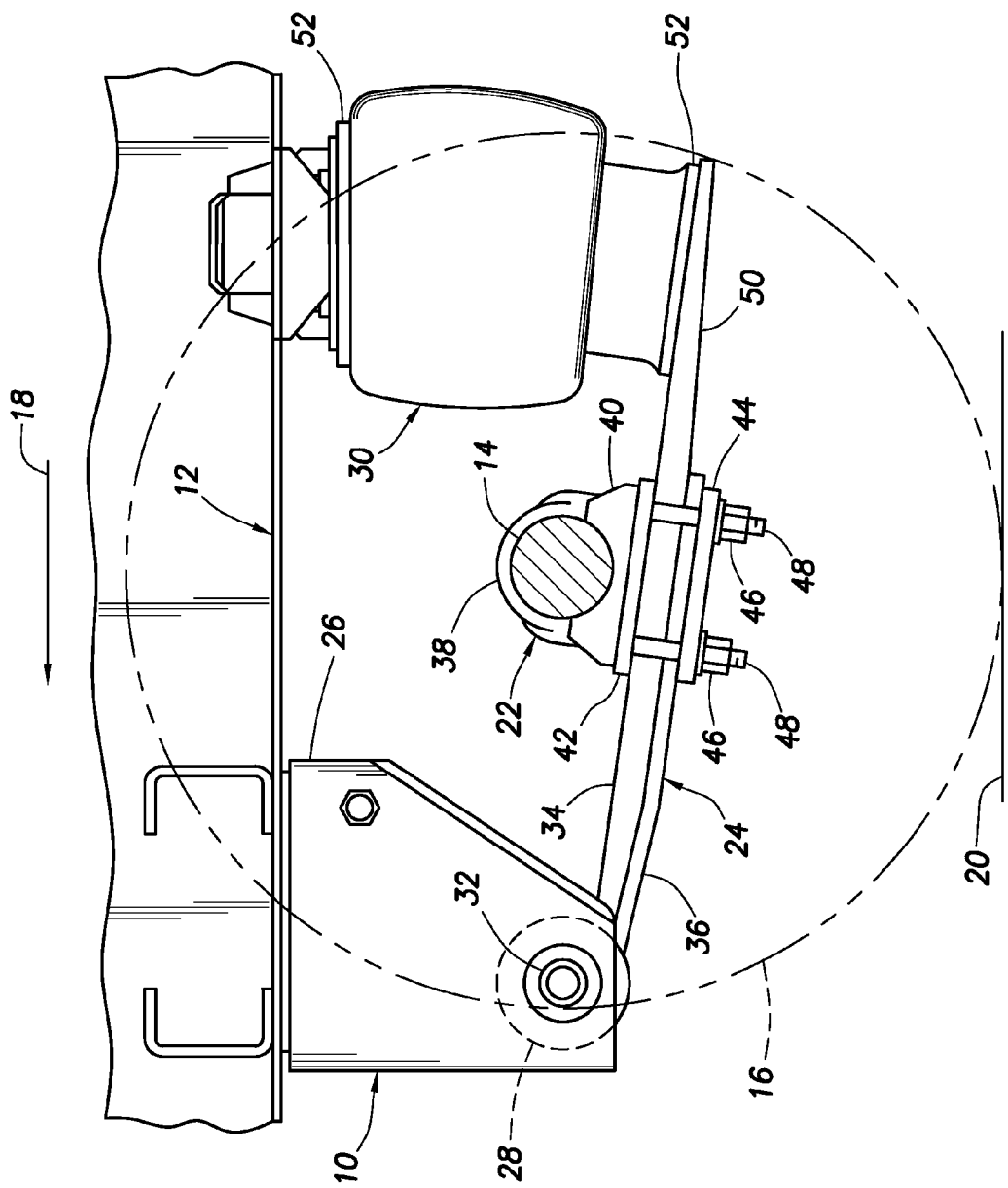
FIG. 1 is a side elevational view of a prior art spring beam suspension system.

Illustrated in FIG. 1 is a prior art spring beam suspension system 10. The suspension system 10 shown in FIG. 1 is similar to that disclosed in U.S. Pat. No. 4,506,910 to Bierens. The suspension system 10 interconnects a vehicle frame 12 to an axle 14, which, in turn, is rotatably connected to a road-engaging wheel 16.

The frame 12 is elongated in a direction generally perpendicular to an axis of the axle 14. Thus, the axle 14 is transversely oriented relative to the frame 12. Axle 14 is also generally parallel to a road surface 20 which is contacted by the wheel 16.

A forward direction of travel of the vehicle frame 12 is indicated by arrow 18. As the vehicle frame 12 is displaced in the forward direction 18, wheel 16 rotates about a spindle (not shown) at an outer end of the axle 14. As used herein, the "forward" direction is longitudinally toward a front of a vehicle, and the "rearward" direction is longitudinally toward a rear of the vehicle.

The suspension system 10 includes an axle clamp 22, a spring beam 24, a hanger 26, a bushing 28, and an air spring 30. It is to be understood that suspension system 10 includes an essentially identical set of axle clamp 22, spring beam 24, hanger 26, bushing 28, air spring 30, and wheel 16 at an opposite end of the axle 14, transversely spaced apart from the set shown in FIG. 1.

The hanger 26 is welded, bolted, or otherwise rigidly secured to the frame 12 and extends downwardly therefrom. The bushing 28 pivotably attaches the spring beam 24 to the hanger 26 and is received in an eye (not shown) formed at the forward end of the spring beam. Thus, spring beam 24 may pivot with the bushing 28 which is held in place between opposite sides of the hanger 26 by fastener 32.

The spring beam 24 includes an elongated and longitudinally disposed spring member 34, which extends from the bushing 28 to the air spring 30, and a relatively shorter stiffening member 36, which extends from the bushing 28 to the axle clamp 22. In this manner, the spring beam 24 is made relatively stiffer between the bushing 28 and the axle clamp 22 than it is between the axle clamp 22 and the air spring 30.

The axle clamp 22 is disposed longitudinally intermediate the bushing 28 and the air spring 30. The axle clamp 22 includes two U-bolts 38 (only one of which is visible in FIG. 1), a saddle 40, an upper plate 42, a lower plate 44, and four nuts 46 (only two of which are visible in FIG. 1). The U-bolts 38 serve to partially encircle the axle 14 and apply a vertical clamping force to the axle when nuts 46 are tightened onto the downwardly projecting threaded ends 48 of the U-bolts.

The air spring 30 is vertically disposed between a rearwardly extending end 50 of the spring beam 24 and the vehicle frame 12. In general, the air spring 30 permits the frame 12 to be raised or lowered relative to the axle 14, adjusts for heavier or lighter loads placed on the frame, affects the compliance of the suspension system 10, etc. A leveling valve (not shown) may adjust air pressure in the air spring 30 to compensate for varied loads carried on the vehicle frame 12. Plates 52 at either end of the air spring 30 facilitate mounting the air spring to flat surfaces on the spring beam end 50 and frame 12.

Figure 2:
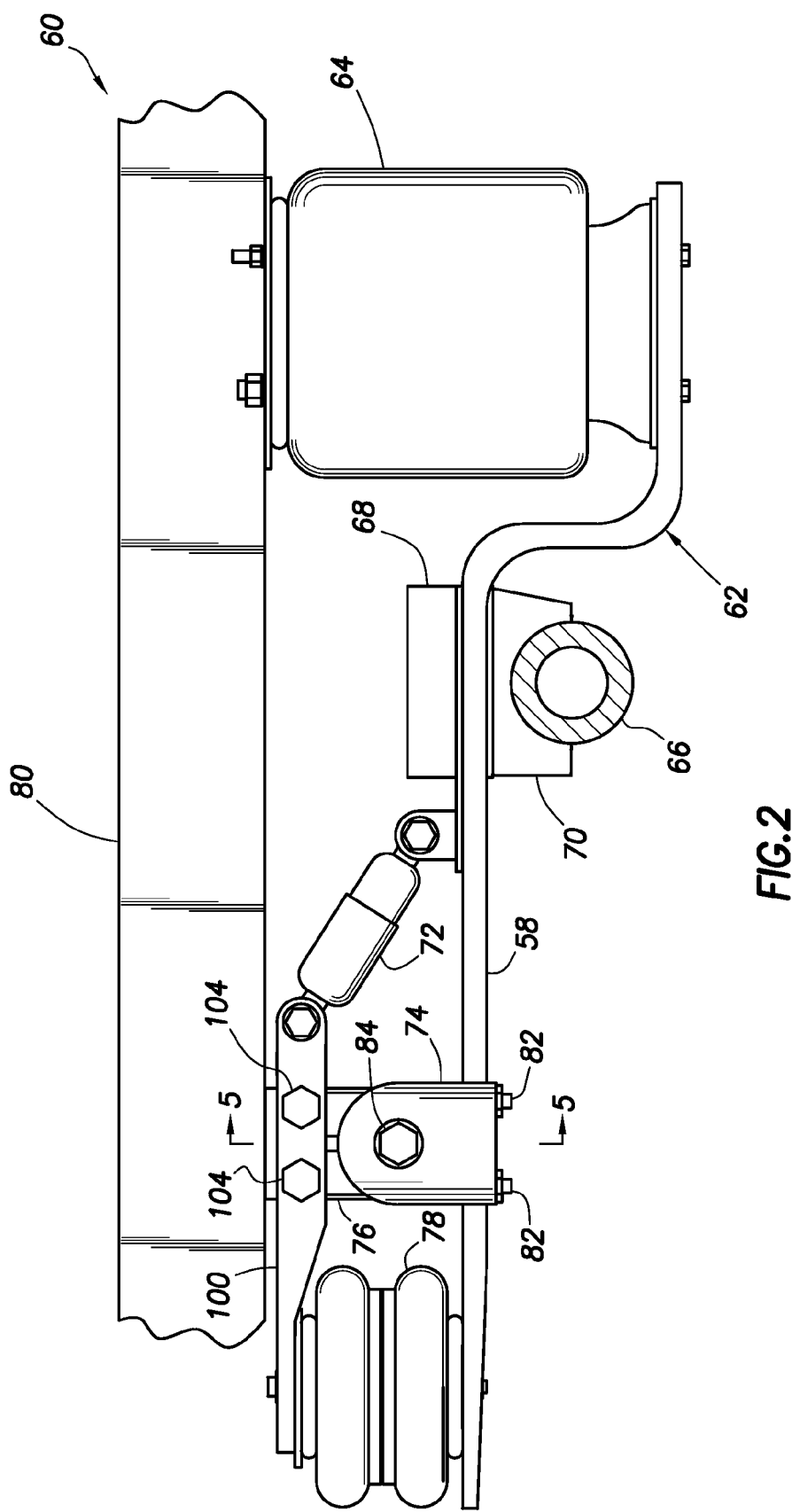
FIG. 2 is a schematic side elevational view of a suspension system embodying principles of the present disclosure.

Representatively illustrated in FIG. 2 is a spring beam suspension system 60 which embodies principles of the present disclosure. It is to be understood that the various embodiments described herein may be utilized in various configurations, without departing from the principles of the present disclosure.

The embodiments are described merely as examples of useful applications of the principles of the disclosure, which are not limited to any specific details of these embodiments. In the following description of the representative embodiments of the disclosure, directional terms, such as "above", "below", "upper", "lower", etc., are used for convenience in referring to the accompanying drawings.

As depicted in FIG. 2, the suspension system 60 includes an elongated spring beam 62, an air spring 64, an axle 66, an axle saddle 70, a shock absorber 72, a generally U-shaped pivot bracket 74, a hanger 76 and a lift actuator 78. The air spring 64 is positioned at a rearward end of the beam 62 and biases the frame 80 upward relative to the axle 66.

The lift actuator 78 is positioned at a forward end of the beam 62 and functions to lift the axle 66 relative to the frame 80, in order to raise wheels (not shown) out of engagement with a road surface. Preferably, the lift actuator 78 is pneumatically operated (i.e., with air pressure being supplied to the lift actuator when it is desired to lift the axle 66), but other types of actuators may be used, if desired.

Note that the lift actuator 78 rotates the beam 62 and bracket 74 relative to the hanger 76 when the actuator is actuated to lift the axle 66. The lateral stability of the beam 62 in the suspension system 60 is enhanced by the bracket 74 wrapping around the lower end of the hanger 76 and the lower side of the beam in this lifting operation, as well as when the actuator 78 is not actuated.

In the example depicted in FIG. 2, the bracket 74 is secured to the lower side of the beam 62 using fasteners 82. However, the bracket 74 could be secured to the upper side of the beam 62, if desired. A pivot shaft 84 (which can also be a fastener) extends through the opposite sides of the bracket 74, and through a bushing 86 (not visible in FIG. 2, see FIG. 5) secured in the hanger 76 between the opposite sides of the bracket.

When sufficient pressure is supplied to the lift actuator 78, a sufficient downward biasing force is applied by the actuator to the forward end of the spring beam 62, which causes the forward end to pivot downward about the shaft 84, thereby raising the axle 66. Note, however, that use of the actuator 78 is not necessary in keeping with the principles of the present disclosure, since it may not be desired to provide the capability to lift the axle 66 in the suspension system 60. Thus, the suspension system 60 can be provided with or without the lift actuator 78.

Figure 5:
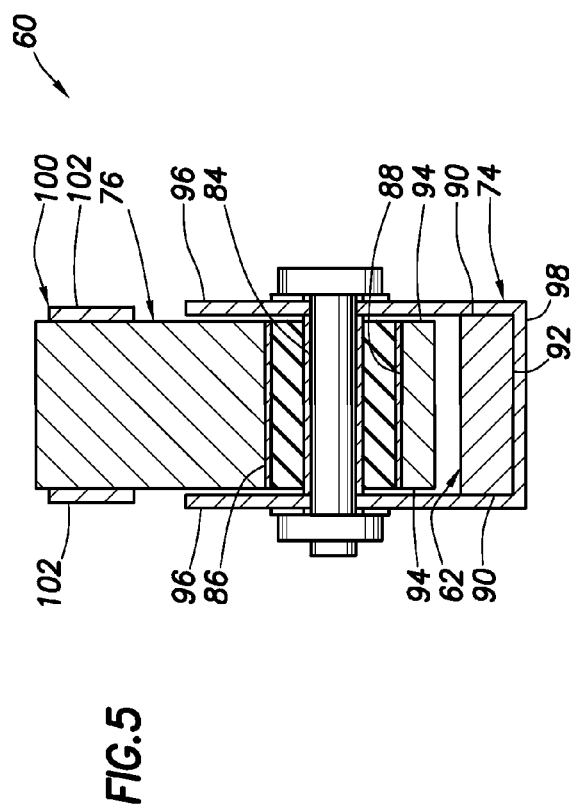
FIG. 5 is a schematic cross-sectional view of the suspension system, taken along line 5-5 of FIG. 2.

As depicted in FIG. 5, the bushing 86 is not received in an eye formed at the forward end of the beam 62, but is instead received in the hanger 76. In this manner, the forward end of the beam 62 is available for positioning the actuator 78 thereon, and the bushing 86 is not retained by the beam 62 (which flexes as the axle 66 rotates about a longitudinal axis of the vehicle). The beam 62 pivots relative to the bushing 86, instead of pivoting with the bushing as in conventional spring beam suspension systems.

Preferably, the bushing 86 is press-fit (interference fit) into an opening 88 formed laterally through the hanger 76, although other means of securing the bushing in the hanger may be used, if desired. The bracket 74 is preferably secured to the beam 62 using the fasteners 82, but other means of securing the bracket to the beam may be used, if desired.

Note that the bracket 74 also wraps outwardly about the opposite lateral sides 90 and lower side 92 of the beam 62, thereby securely retaining the beam. Since the bracket 74 is also positioned adjacent opposite lateral sides 94 of the hanger 76, this arrangement operates to securely retain the beam 62 relative to the hanger 76, while still allowing the beam to pivot relative to the hanger. Preferably, opposing legs 96 of the bracket 74 straddle the lateral sides 90, 94 of the beam 62 and hanger 76, while an intermediate portion 98 of the bracket underlies the beam.

This arrangement also permits the hanger 76 to be substantially narrower in width as compared to conventional hanger brackets which are typically made up of formed sheet steel elements with sides that straddle a beam or arm of the suspension (such as the hanger 26 depicted in FIG. 1). Thus, the hanger 76 can be used with narrower frame rails.

Another benefit is that the hanger 76 can be made of a single piece of material (such as a cast aluminum piece, etc.) which saves weight and reduces manufacturing costs. Different run heights can also be easily produced by providing various lengths of the hanger 76. The hanger 76 can be attached to the frame 80 using fasteners (such as bolts, rivets, etc.), or the hanger could be welded to the frame.

Yet another beneficial feature of the suspension system 60 is that the spring beam 62 can be constructed using a single spring member 58 which extends all the way from the lower end of the lift actuator 78 (if the lift actuator is used, otherwise from the hanger 76) to the lower end of the air spring 64. Of course, additional spring members, stiffening members, etc. may be provided with the spring beam 62, if desired.

Figure 3:
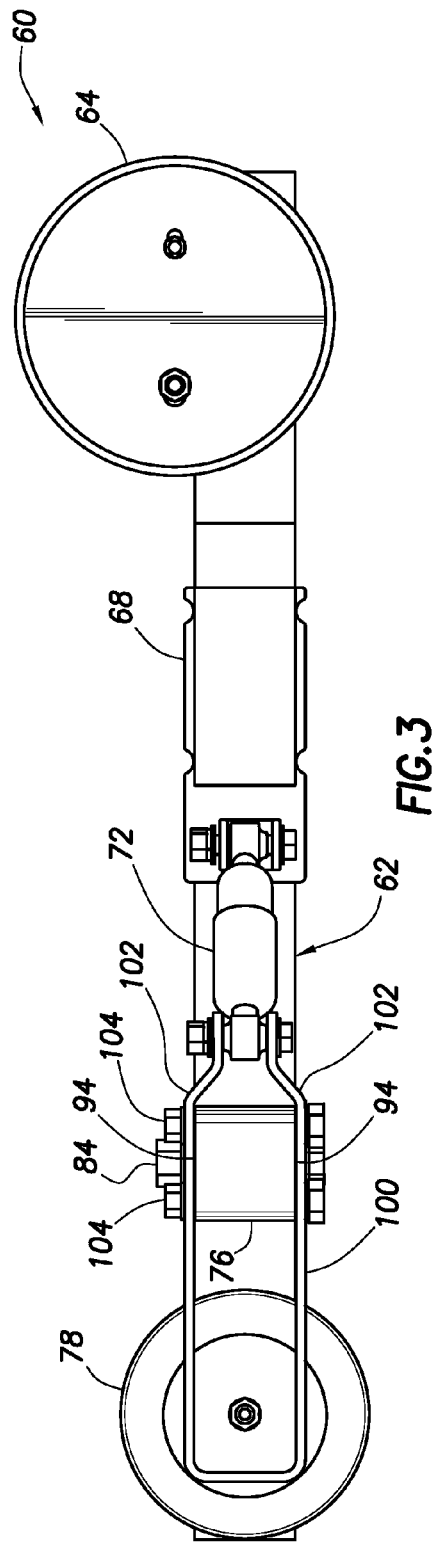
FIG. 3 is a schematic top plan view of the suspension system of FIG. 2.

Referring additionally now to FIG. 3, a top plan view of the suspension system 60 is representatively illustrated. In this view, it may be seen that a one-piece bracket 100 wraps about the hanger 76 and serves at its rearward end as a means to attach the upper end of the shock absorber 72 to the hanger, and at its forward end as a support for the upper end of the lift actuator 78. Thus, both the shock absorber 72 and the lift actuator 78 are secured to the hanger 76 by means of the single bracket 100.

Of course, multiple brackets could be provided to serve the functions of the bracket 100, and the bracket 100 could be made up of multiple elements. However, there are significant advantages in weight savings, reduced complexity, ease of maintenance and assembly, and reduced costs associated with the bracket 100 as used in the suspension system 60.

In the illustrated example, the bracket 100 includes two legs 102 which are secured adjacent to the lateral sides 94 of the hanger 76 using fasteners 104. The shock absorber 72 is pivotably attached to rearward ends of the legs 102, and the lift actuator 78 is attached to forward ends of the legs. Of course, other attachment means (such as welding instead of the fasteners 104, etc.) and other configurations (such as separate brackets to attach the lift actuator and shock absorber to the hanger, etc.) could be used, if desired.

Figure 4:
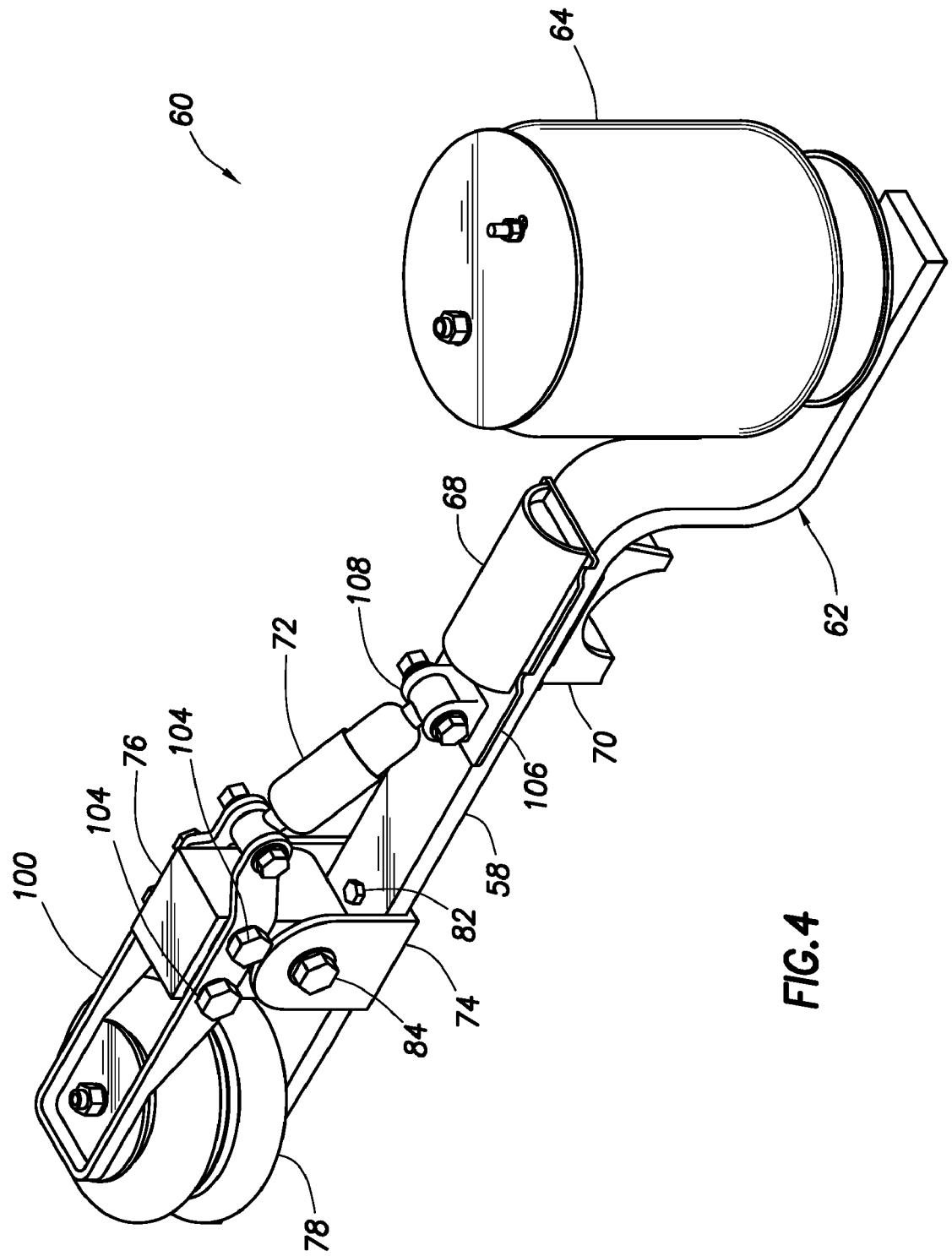
FIG. 4 is a schematic isometric view of the suspension system.

Referring additionally now to FIG. 4, an isometric view of the suspension system 60 is representatively illustrated. In this view, it may be seen that the axle clamp 68 includes a top plate 106 on which a bracket 108 is secured for pivotably attaching a lower end of the shock absorber 72. Thus, the shock absorber 72 is secured between the axle clamp 68 and the hanger 76 by the bracket 108 at its lower end, and by the bracket 100 at its upper end.

For clarity of illustration, the exact means by which the axle 66 is secured to the beam 62 is not depicted in FIGS. 2-4, but preferably the axle is secured to the beam using an integrally formed axle seat, such as the one described in U.S. Pat. No. 5,634,655, the entire disclosure of which is incorporated herein by this reference. The integrally formed axle seat could be used in place of the axle clamp 68 and saddle 70, or the axle 66 could be secured to the beam 62 using an axle clamp, saddle and U-bolts similar to the elements 22, 38, 40 described above and depicted in FIG. 1. Thus, it will be appreciated that any means of securing the axle 66 to the beam 62 may be used in keeping with the principles of this disclosure.

It may now be fully appreciated that the above disclosure provides many advancements to the art of spring beam suspension systems. In particular, the disclosure provides the suspension system 60 which is relatively light in weight, has reduced complexity, improved reliability and lower cost of manufacture and maintenance.

The above disclosure describes a spring beam suspension system 60 which includes a hanger 76, a flexible spring beam 62 extending between the hanger 76 and an axle 66, and a generally U-shaped pivot bracket 74 secured to the spring beam 62. The pivot bracket 74 includes opposing legs 96 which are pivotably attached to the hanger 76.

The pivot bracket legs 96 may outwardly straddle opposing lateral sides 90 of the spring beam 62 and opposing lateral sides 94 of the hanger 76. The pivot bracket 74 may also include an intermediate portion 98 extending between the legs 96, and the intermediate portion 98 may be positioned outwardly adjacent a lower side 92 of the spring beam 62.

The pivot bracket 74 may be positioned longitudinally between an air spring 64 and a lift actuator 78 along the spring beam 62.

A bushing 86 may be received in the hanger 76 between the legs 96 of the pivot bracket 74. A pivot shaft 84 may extend laterally through the bushing 86 and the pivot bracket legs 96.

The lift actuator 78 may be connected between a forward end of the spring beam 62 and a portion of a support bracket 100 extending forward from the hanger 76. A shock absorber 72 may be pivotably secured to a portion of the support bracket 100 extending rearward from the hanger 76.

Also described by the above disclosure is a spring beam suspension system 60 which includes a hanger 76, a flexible spring beam 62 extending between the hanger 76 and an axle 66, and a lift actuator 78 which lifts the axle 66 by applying a biasing force to a portion of the spring beam 62 which extends forward from the hanger 76.

The lift actuator 78 may be connected between the forward portion of the spring beam 62 and a portion of a support bracket 100 extending forward from the hanger 76. A shock absorber 72 may be pivotably secured to a portion of the support bracket 100 extending rearward from the hanger 76.

The above disclosure also describes a suspension system 60 which includes a hanger 76 for attaching the suspension system 60 to a frame 80 of a vehicle, a beam 62 extending between the hanger 76 and an axle 66, with the beam 62 being pivotably attached to the hanger 76, and a bushing 86 secured in the hanger 76. In this manner, the beam 62 pivots relative to the bushing 86. The bushing 86 may be press-fit in the hanger 76.

The suspension system 60 is not necessarily a spring beam suspension system in keeping with the principles of this disclosure, but the beam 62 is preferably a spring beam. As used herein, the term "spring beam" is used to indicate a substantially flexible beam which pivotably connects an axle to a vehicle frame (preferably via a hanger extending downwardly from the frame). In the suspension system 60 described above, the spring beam 62 is sufficiently flexible to permit its forward end to twist (rotate relative to a longitudinal axis of the vehicle) relative to the rearward end of the beam as the axle 66 displaces vertically.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A spring beam suspension system, comprising:
   a hanger secured at one end to a frame of a vehicle;
   a flexible spring beam extending between the hanger and an axle; and a generally U-shaped pivot bracket secured to the spring beam, the pivot bracket including opposing legs which are pivotably attached to the hanger.

2. The spring beam suspension system of claim 1, wherein the pivot bracket legs outwardly straddle opposing lateral sides of the spring beam and opposing lateral sides of the hanger.

3. The spring beam suspension system of claim 1, wherein the pivot bracket further includes an intermediate portion extending between the legs, and wherein the intermediate portion is positioned outwardly adjacent a lower side of the spring beam.

4. The spring beam suspension system of claim 1, wherein a bushing is received in the hanger between the legs of the pivot bracket.

5. The spring beam suspension system of claim 4, wherein a pivot shaft extends laterally through the bushing and the pivot bracket legs.

6. The spring beam suspension system of claim 1, further comprising a lift actuator connected between a forward end of the spring beam and a portion of a support bracket extending forward from the hanger.

7. The spring beam suspension system of claim 6, wherein a shock absorber is pivotably secured to a portion of the support bracket extending rearward from the hanger.

8. A spring beam suspension system, comprising:
a hanger;
a flexible spring beam extending between the hanger and an axle; and
a generally U-shaped pivot bracket secured to the spring beam, the pivot bracket including opposing legs which are pivotably attached to the hanger,
wherein the pivot bracket is positioned longitudinally between an air spring and a lift actuator along the spring beam.

9. A spring beam suspension system, comprising:
a hanger;
a flexible spring beam extending between the hanger and an axle;
a lift actuator which lifts the axle by applying a biasing force to a portion of the spring beam which extends forward from the hanger; and
a generally U-shaped pivot bracket secured to the spring beam, the pivot bracket including opposing legs which are pivotably attached to the hanger.

10. The spring beam suspension system of claim 9, wherein the pivot bracket legs outwardly straddle opposing lateral sides of the spring beam and opposing lateral sides of the hanger.

11. The spring beam suspension system of claim 9, wherein the pivot bracket further includes an intermediate portion extending between the legs, and wherein the intermediate portion is positioned outwardly adjacent a lower side of the spring beam.

12. The spring beam suspension system of claim 9, wherein the pivot bracket is positioned longitudinally between an air spring and the lift actuator along the spring beam.

13. The spring beam suspension system of claim 9, wherein a bushing is received in the hanger between the legs of the pivot bracket.

14. The spring beam suspension system of claim 13, wherein a pivot shaft extends laterally through the bushing and the pivot bracket legs.

15. A suspension system, comprising:
a hanger for attaching the suspension system to a frame of a vehicle;
a beam extending between the hanger and an axle, the beam being pivotably attached to the hanger; and
a bushing radially outwardly retained by the hanger, whereby the beam pivots relative to the bushing, and wherein the bushing is press-fit in the hanger.

16. A suspension system, comprising:
a hanger for attaching the suspension system to a frame of a vehicle;
a beam extending between the hanger and an axle, the beam being pivotably attached to the hanger;
a bushing secured in the hanger, whereby the beam pivots relative to the bushing; and
a generally U-shaped pivot bracket secured to the beam, the pivot bracket including opposing legs which are pivotably attached to the hanger.

17. The suspension system of claim 16, wherein the bushing is received in the hanger between the legs of the pivot bracket.

18. The suspension system of claim 16, wherein a shaft extends laterally through the bushing and the pivot bracket legs.

19. The suspension system of claim 16, wherein the pivot bracket legs outwardly straddle opposing lateral sides of the beam and opposing lateral sides of the hanger.

20. The suspension system of claim 16, wherein the pivot bracket is positioned longitudinally between an air spring and a lift actuator along the beam.

21. The suspension system of claim 16, further comprising a lift actuator connected between a forward end of the beam and a portion of a support bracket extending forward from the hanger, and wherein a shock absorber is pivotably secured to a portion of the support bracket extending rearward from the hanger.

* * * * *